Figure 1:
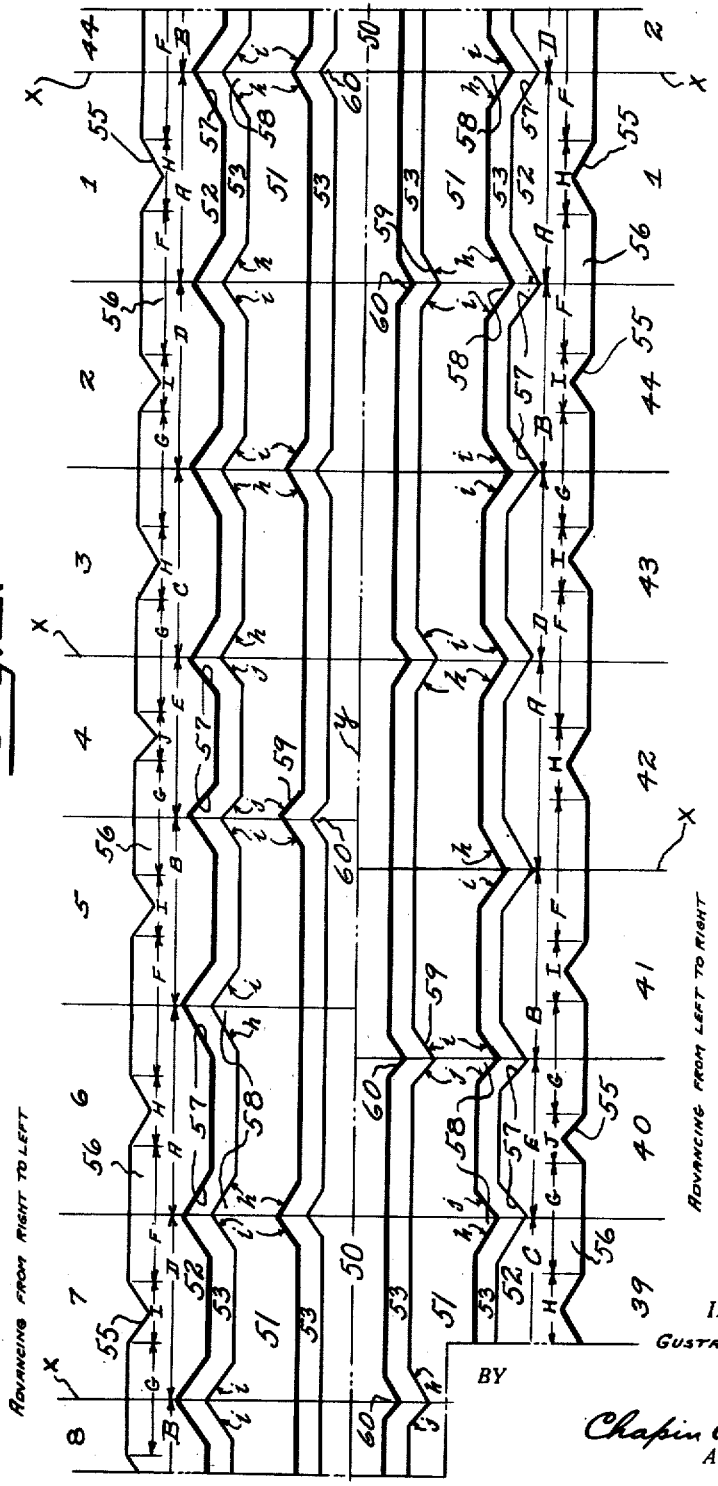

July 26, 1938.  G. HUBACH  2,124,821
PNEUMATIC TIRE TREAD
Filed March 30, 1936  2 Sheets-Sheet 2

INVENTOR.
GUSTAVE HUBACH
BY
Chapin & Neal
ATTORNEYS.

Patented July 19, 1938

2,124,821

UNITED STATES PATENT OFFICE 2,124,821

PNEUMATIC TIRE TREAD

Gustave Hubach, Springfield, Mass., assignor to The Fisk Rubber Corporation, Chicopee Falls, Mass., a corporation of Delaware Application March 30, 1936, Serial No. 71,699

4 Claims. (Cl. 152—209)

This invention relates to the construction of pneumatic tires and more particularly to the tread portion of such tires.

The general object of the invention is to provide a tire tread which will not develop a noise or hum under varying speed conditions of operation. The tread noise to which reference is made arises for the most part from vibrations set up by the configurations which make up the tread surface striking the road surface in a rhythmic sequence which at relative high speeds of tire rotation produce vibrations of audible frequency. The characteristics of the noise produced are related in a general way to the shape, size and spacing of the blocks, buttons or other elements which make up the relief pattern of the tread. A number of attempts have been made to produce so-called silent treads by arranging the relief elements in similar successive groups, the successive elements of each group progressively varying in shape, size and spacing. This grouping of the elements has been necessary to preserve a characteristic appearance or design around the entire periphery of the tire since if the progressive change was continued completely around the tire or even for a substantial distance, the distortion from the original design becomes objectionably noticeable, and it would be difficult if not impossible to balance such a tire. Furthermore, the cutting of a mold without a repetition of groups would be exceedingly expensive.

This "grouping" of the elements which is necessary under the prior practice is objectionable because the "groups" tend to produce a vibration of audible frequency. A further objection is that such a tire tends to wear unevenly since the size, shape and spacing of the tread elements affect their ability to withstand abrasion from road contact and if the successive variations are carried to a point approximating complete noise elimination the sacrifice of wearing qualities becomes objectionable. Thus present practice in regard to "silent-treads" falls short of its object because it requires compromising the factors of tread wear, mold costs, retention of a characteristic appearance, tire balance, non-skid efficiency, and silent operation.

More specifically the object of the present invention may be stated as the provision of a tire tread in which a maximum degree of silent operation is secured without substantial sacrifice of the qualities above mentioned.

I obtain this result by dividing each half of the tread into a large number of relatively short units which are not grouped in repeated series and which differ from each other in a way to silence the tread without encountering the objections above mentioned.

Figure 2:
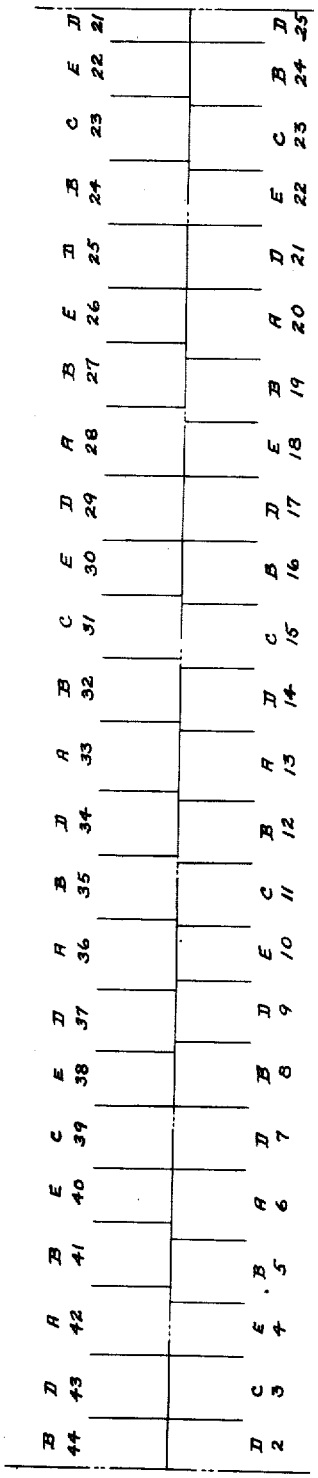
Figure 3:
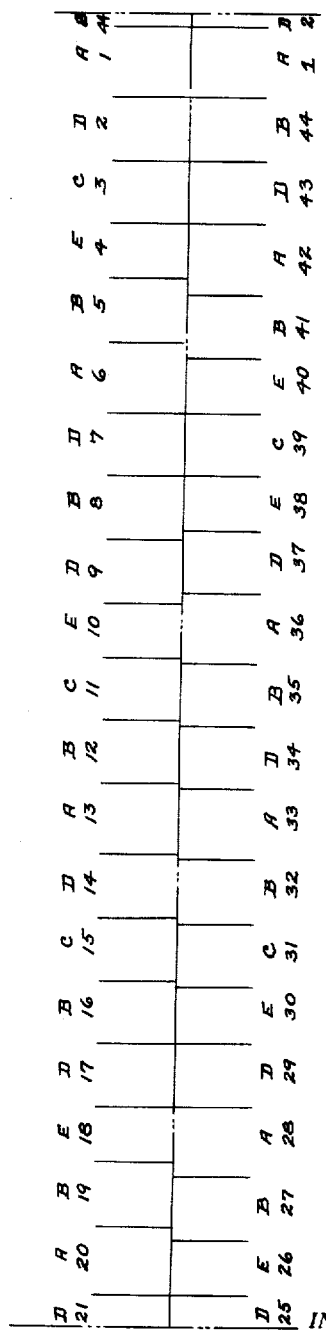

In the accompanying drawings which illustrate one embodiment of the invention;

Fig. 1 is a plan view of a portion of the tread of a tire with the non-skid elements arranged in accordance with my invention; and Figs. 2 and 3 are diagrammatic views which together indicate a complete tread length to show the successive relation of the tread units around the complete periphery of the tire.

Referring to Fig. 1 of the drawings, the tread configuration is shown as comprising a center rib 50, intermediate ribs 51 and side ribs 52. These ribs are spaced from each other by grooves 53 which are of uniform width. The side ribs 52 are provided on their outer edge with spaced triangular notches 55 which divide the ribs 52 into portions 56 which for convenience of reference I term pads. The inner edges of the ribs 52 are formed with triangular notches 57 which are positioned intermediate the notches 55.

The ribs 51 are formed on their outer edge with triangular projections 58 which extend into the notches 57 of the ribs 52. As will be later more fully explained, the angular inclination of the sides of the projections 58 are made equal to the angular inclination of the opposite side of the notch 57 into which the projection extends. Stated in another way, the opposite walls of the grooves 53 are parallel. The inner edges of the ribs 51 are provided with triangular notches 59 which are positioned opposite alternate projections 58. Triangular projections 60 formed on the edges of the center rib 50 extend into notches 59, the opposite walls of notches 59 and projections 60 being parallel. The projections 60 are staggered on opposite sides of the rib 50. Lines $x$ drawn through the points of projections 58 at right angles to the center line $y$ of the tread divide each half of the tread into units which are numbered 1 to 44 around the periphery of the tire (see Figs. 2 and 3). This number is suitable for a 6.00/16 tire. As will be apparent from Figs. 2 and 3, the units on opposite sides of the tire are not always of equal length peripherally of the tire, and are numbered in opposite directions.

The notches 55, 57, 59, projections 58 and 60, and pads 56 form the elements of the tread and variation in the characteristics of these elements, together with varying unit lengths in the relation now to be described, comprise my novel manner of silencing the tread.

There are five types of units indicated by the letters A, B, C, D and E. It is convenient to consider these also as the length of the units. In the make up of the units there are two different lengths of "pads" 56 which are designated F and G, and three different lengths of notches 55 which are designated H, I and J. There are also three different angular relations of the walls of the notches and projections with respect to the center line of the tire, which angles are designated $h$, $i$ and $j$.

As will be obvious from Fig. 1, the dimensions of the several types of units bear the following relations:

$$A = \tfrac{1}{2}F + H + \tfrac{1}{2}F$$
$$B = \tfrac{1}{2}G + I + \tfrac{1}{2}F$$
$$C = \tfrac{1}{2}G + H + \tfrac{1}{2}G$$
$$D = \tfrac{1}{2}F + I + \tfrac{1}{2}G$$
$$E = \tfrac{1}{2}G + J + \tfrac{1}{2}G$$

It will also be observed that since the depth of the notches H, I and J transversely of the tire are equal, the angular relations $h$, $i$ and $j$ are established when the lengths H, I and J are chosen, so that angles $h$, $i$ and $j$ are always found in a given unit associated with notches of H, I and J lengths, respectively. From this it follows that the sides of the V-shaped notches 57 and 59 do not intersect on the lines $x$ except when B and D units are positioned adjacent each other as illustrated by units 7—8 and 43—44 of Fig. 1.

As is evident from an inspection of Fig. 1, the pads 56 and notches and projections 57 and 58 form transition elements between the units A, B, C, D and E and that because of the relations of the lengths F and G of the pads to the length of the units as expressed in the formulas above given, and imposing the added restriction that adjacent units cannot be of the same type, it follows that an "A" unit can only advance from a "B" unit; a "B" unit can only advance from a "C", "D" or "E" unit; a "C" unit can only advance from a "D' or "E" unit; a "D" unit can only advance from an "A" or "B" unit; and an "E" unit can only advance from a "C" or "D" unit. A transition element is therefore one which is shared by adjacent units and which limits the character of the succeeding unit, but without imposing a specific identity upon it. This use of transition elements assists in giving an appearance of continuity to the design as a whole while still remaining a variable factor in the construction of the units.

The actual dimensions selected for the tread elements may vary within reasonable limits and would depend upon the size of the tire.

For a 6.00/16 inch tire the following values have proved satisfactory in practice:

F=1.450"; G=1.200"; H=.750"; I=.625"; J=.500". With these values the unit lengths are as follows: A=2.200"; B, C, D=1.950"; E=1.700".

Subject to the limitations imposed by the pad lengths, as above pointed out, the succession of pads may be chosen as desired and without producing any repeated series. An arrangement of 44 units which has proved satisfactory in practice is diagrammatically shown in Figs. 2 and 3 of the drawings. The following table indicates the complete characteristics of the succession of tread elements in the arrangement of Figs. 2 and 3:

| h h | i i | h h | j j | i i | h h | i i | i i | i i | j j | h h |
|-----|-----|-----|-----|-----|-----|-----|-----|-----|-----|-----|
| A | D | C | E | B | A | D | B | D | E | C |
| F H F | I G H G | J G I | F H F | I G | I F | I G | J G H G |
| 1 | 2 | 3 | 4 | 5 | 6 | 7 | 8 | 9 | 10 | 11 |

| i i | h h | i i | h h | i i | i i | j j | i i | h h | i i | j j |
|-----|-----|-----|-----|-----|-----|-----|-----|-----|-----|-----|
| B | A | D | C | B | D | E | B | A | D | E |
| I F H F | I G H G | I F | I G | J G | I F H F | I G | J |
| 12 | 13 | 14 | 15 | 16 | 17 | 18 | 19 | 20 | 21 | 22 |

| h h | i i | i i | j j | i i | h h | i i | j j | i i | h h |
|-----|-----|-----|-----|-----|-----|-----|-----|-----|-----|
| C | B | D | E | B | A | D | E | C | B | A |
| G H G I F | I G | J G | I F H F | I G | J G H G | I F H |
| 23 | 24 | 25 | 26 | 27 | 28 | 29 | 30 | 31 | 32 | 33 |

| i i | i i | h h | i i | j j | h h | j j | i i | h h | i i | i i |
|-----|-----|-----|-----|-----|-----|-----|-----|-----|-----|-----|
| D | B | A | D | E | C | E | B | A | D | B |
| F I G I F | I G | J G H G | J G | I F H F | I G I |
| 34 | 35 | 36 | 37 | 38 | 39 | 40 | 41 | 42 | 43 | 44 |

It will be obvious that no repeated similar "series" of units results. Further the "variations" within the unit types do not substantially alter the characteristic appearance of the tread and since they involve angular variation, which is equivalent to a position change, length variation which directly breaks up rhythmic contact with the road and the two variously combined vary the contact area, the variations may be individually small in amount. As a result no objectionable unbalancing of the tire results. Furthermore, only two different pad lengths and three angular relations of the walls of the grooves are employed, from which the unit lengths and the lengths H, I and J are derived. The result is that the costs of cutting of the molds are kept within reasonable and commercially acceptable limits.

The division of the tread into units may be variously made; for example, the distance between the apexes of the triangular notches 55 could be chosen as the unit length, in which case one-half the length of said notches would become the transition factor of the tread edge instead of one-half the pad lengths.

Different sizes of tires may be accommodated either by appropriately changing the dimensions of the units, keeping their number constant, or the dimensions of the unit may be kept constant, and the number of units appropriately decreased or increased, or changes in both the dimensions and number of the units may be made.

Having thus described my invention, I claim:

1. A tire having a tread composed of a plurality of circumferentially arranged non-skid elements, said elements being arranged in dissimilar units, each unit having a predetermined characteristic element preceded and followed by partial transition elements which partial transition elements are completed by the partial transition elements of the preceding and following units, the dissimilarity between adjacent units depending on dissimilar combinations of said characteristic and partial transition elements, the units progressing circumferentially around the tire without periodic recurrence of a given unit or given sequence of units.

2. A tire having a tread composed of a plurality of circumferentially arranged ribs spaced from each other by circumferential grooves, said ribs being shaped to form a succession of non-skid elements, said elements being arranged in units, each unit having a predetermined characteristic element preceded and followed by partial transition elements which partial transition elements are completed by the partial transition elements of the preceding and following units, said characteristic and partial transition elements being variously combined within the units, so that the units progress circumferentially around the tire without periodic recurrence of a given unit or given sequence of units.

3. A tire having a tread composed of circumferential succession of non-skid units, each unit being formed of a permutation of a limited number of non-skid elements, the units progressing around the tire without periodic recurrence of similar units or similar sequence of units.

4. A tire having a tread composed of a plurality of non-skid elements of differing dimensions arranged circumferentially in dissimilar successive units, each unit comprising a characteristic non-skid element preceded and followed by a portion of a transition non-skid element, the remaining portions of said transition elements forming corresponding parts of the immediately preceding and succeeding units, said characteristic elements and transition elements being so combined that the units are progressively formed circumferentially around the tire without periodic recurrence of a given unit or given sequence of units.

GUSTAVE HUBACH.

CERTIFICATE OF CORRECTION.

Patent No. 2,124,821.  July 26, 1938.

GUSTAVE HUBACH.

It is hereby certified that error appears in the above numbered patent requiring correction as follows: Page 1 of the printed specification, upper left-hand corner, patented date, for "July 19, 1938" read July 26, 1938; and that the said Letters Patent should be read with this correction therein that the same may conform to the record of the case in the Patent Office.

Signed and sealed this 30th day of August, A. D. 1938.

Henry Van Arsdale (Seal)  Acting Commissioner of Patents.

2. A tire having a tread composed of a plurality of circumferentially arranged ribs spaced from each other by circumferential grooves, said ribs being shaped to form a succession of non-skid elements, said elements being arranged in units, each unit having a predetermined characteristic element preceded and followed by partial transition elements which partial transition elements are completed by the partial transition elements of the preceding and following units, said characteristic and partial transition elements being variously combined within the units, so that the units progress circumferentially around the tire without periodic recurrence of a given unit or given sequence of units.

3. A tire having a tread composed of circumferential succession of non-skid units, each unit being formed of a permutation of a limited number of non-skid elements, the units progressing around the tire without periodic recurrence of similar units or similar sequence of units.

4. A tire having a tread composed of a plurality of non-skid elements of differing dimensions arranged circumferentially in dissimilar successive units, each unit comprising a characteristic non-skid element preceded and followed by a portion of a transition non-skid element, the remaining portions of said transition elements forming corresponding parts of the immediately preceding and succeeding units, said characteristic elements and transition elements being so combined that the units are progressively formed circumferentially around the tire without periodic recurrence of a given unit or given sequence of units.

GUSTAVE HUBACH.

CERTIFICATE OF CORRECTION.

Patent No. 2,124,821.  July 26, 1938.

GUSTAVE HUBACH.

It is hereby certified that error appears in the above numbered patent requiring correction as follows: Page 1 of the printed specification, upper left-hand corner, patented date, for "July 19, 1938" read July 26, 1938; and that the said Letters Patent should be read with this correction therein that the same may conform to the record of the case in the Patent Office.

Signed and sealed this 30th day of August, A. D. 1938.

Henry Van Arsdale (Seal)  Acting Commissioner of Patents.